United States Patent [19]

Medlin

[11] 4,333,282

[45] Jun. 8, 1982

[54] MULTI-LAYERED BULLETPROOF WINDOW

[76] Inventor: Richard C. Medlin, 2434 Toftrees, San Antonio, Tex. 78209

[21] Appl. No.: 146,300

[22] Filed: May 5, 1980

Related U.S. Application Data

[63] Continuation-in-part of Ser. No. 920,715, Jun. 30, 1978, Pat. No. 4,316,404.

[51] Int. Cl.³ .......................... E06B 7/12; E06B 3/24
[52] U.S. Cl. ..................................... 52/172; 109/49.5; 52/400; 52/788
[58] Field of Search ................... 428/34, 412; 52/171, 52/172, 173, 398, 400, 788; 109/49.5, 10, 21.5; 89/36 R, 36 A, 36 H

[56] References Cited

U.S. PATENT DOCUMENTS

| | | | |
|---|---|---|---|
| 3,604,163 | 9/1971 | McCurdy et al. | 52/172 |
| 3,872,804 | 3/1975 | Yarnall | 109/49.5 |
| 3,919,023 | 11/1975 | Bowser et al. | 52/788 X |
| 3,930,452 | 1/1976 | Van Laethem et al. | 109/49.5 X |
| 3,940,898 | 3/1976 | Kaufman | 52/400 |
| 3,990,202 | 11/1976 | Becker | 52/172 |
| 4,065,894 | 1/1978 | Day | 52/171 |

FOREIGN PATENT DOCUMENTS

| | | | |
|---|---|---|---|
| 2016013 | 10/1971 | Fed. Rep. of Germany | 52/172 |
| 515085 | 11/1939 | United Kingdom | 52/172 |
| 1529344 | 10/1978 | United Kingdom | 52/171 |
| 587222 | 1/1978 | U.S.S.R. | 52/171 |
| 595472 | 2/1978 | U.S.S.R. | 52/171 |

*Primary Examiner*—J. Karl Bell
*Attorney, Agent, or Firm*—Gunn, Lee & Jackson

[57] ABSTRACT

A two section bulletproof window and method of making the same is shown. The outer section is multi-layered, the outer layer being safety plate glass. Inner layers of the outer section are composed of polycarbon laminate. The inner section is also composed of layers of polycarbon laminate and is separated from the outer section by a space containing dry nitrogen gas at about 2.5 pounds per square inch pressure. The space is necessary to allow for differential rates of expansion and contraction of the sections and layers without damaging the window. The positively pressured dry nitrogen gas is necessary to maintain a dust free and moisture free atmosphere within the space. An inexpensive pressurized nitrogen gas reservoir is utilized to guarantee long term maintenance of the positive nitrogen pressure within the space. The method of making the protective window involves continuous purging of the space with the dry nitrogen gas while the different sealants involved are curing. Means of positioning the sections of the protective window and means of utilizing the protective window itself are also shown.

8 Claims, 4 Drawing Figures

MULTI-LAYERED BULLETPROOF WINDOW

CROSS REFERENCE

This application is a continuation-in-part of my copending application Ser. No. 920,715 filed June 30, 1978, now U.S. Pat. No. 4,316,404 entitled A LIGHTWEIGHT ARMORED VEHICLE AND METHOD OF MAKING SAME.

BACKGROUND OF THE INVENTION

This invention relates to protective windows and, more particularly, to compact and lightweight protective windows. Lightweight protective windows are necessary for many reasons. A primary application is used with armored vehicles. In contrast to permanent hardened locations, such as bank teller booths, the weight of the armor plating and armored windows is often of critical importance when constructing an armored vehicle. This is particularly true when retrofitting a standard type automobile to provide a lightweight armored vehicle which does not appear to be armored. Other applications of lightweight protective windows, such as with armored self-service station modules, may advantageously use the invented protective window rather than standard safety plate glass. Often times the cost advantage derived by reducing the weight to be supported is very substantial. Furthermore, merely reducing the amount of expensive safety glass necessary to harden the target is often extremely important in reducing the overall cost.

Additionally, new types of plastics and glass have been developed and are being developed which have different uses in the halting of high velocity projectiles and bullets. Very hard and brittle safety plate glass or specially treated plastics, for example, are often placed near the outer surface of protective windows to flatten and/or fragment the incoming projectile. This type of layer is also resistant to scratching and other wear and thus is economical to maintain. More flexible and malleable layers of plastics may be placed behind such a sheet in order to stop the flattened projectile or projectile fragments without spalling (fragmenting of the protective shield). If only brittle glass or plastics are used, spalling may result in some bullets so facturing the protective window as to penetrate it. The combination of a hard outer layer with a more flexible inner layer is a more effective means of stopping incoming projectiles than the use of either layer separately.

Even without the need for lightweight protective windows, therefore, many future protective windows will utilize a plurality of layers, each layer adapted to a different purpose. Because these layers often have differential rates of expansion, the individual layers should be separated from each other to avoid damage to the protective window during temperature changes. The difficulty attendant to such vacant spaces, however, is that over long periods of time dust and moisture may become trapped therewithin. Such dust and moisture accumulations cause clouding and condensation within the vacant spaces and obscure vision through the protective windows. Because the protective windows are often permanently installed, it is difficult or impossible to remove the moisture and dust. An efficient means is needed, therefore, to guarantee that dust and moisture never enter the spaces.

BRIEF DESCRIPTION OF THE PRIOR ART

The particular method described herein for maintaining a moisture and dust free atmosphere within the spaces constructed within the lightweight protective windows is a novel one. The prior art has only one way of dealing with the problem that of encapsulating the spaces with such layers so impermeable that dust and moisture could not get into these spaces. Various means of impermeably sealing have been used with different degrees of success. The method described herein abandons this approach, however, and merely utilizes the precious methods as a single element of the new system. It is realized that in many instances the creation of a totally impermeable layer about these spaces is impractical. Some diffusion of gases and moisture will almost always occur across the "impermeable" layers thus leading to obscured vision through the protective window. If the gas pressure within the space is greater than the gas pressure outside of the space, the inevitable diffusion of gases will occur from within the space rather than vice versa. It is seen that as long as this positive pressure can be maintained within the space, no diffusion of harmful moisture or dust can occur from without the space. The present invention describes a means of maintaining this positive pressure.

The inclusion of spaces between the layers of protective windows has also created further problems. While the use of silicon type sealants is often desirable as the material with which to create the impermeable layers around the spaces, use of these sealants creates its own problems. After application about the spaces, and while the sealant is curing, these sealants give off an assortment of vapors. These vapors enter the space and themselves some cloud the space. At sufficient concentrations, these vapors may permanently mar and obscure the inner faces of the protective layers of the protective windows. The prior art has concentrated on either developing sealants which do not emit such harmful vapors or in separating the sealant as much as possible from the space. A novel means of dealing with this problem is described herein.

SUMMARY OF THE INVENTION

It is an object of the present invention to provide a lightweight protective window.

It is another object of the present invention to provide a lightweight protective window which appears to be ordinary glass to the casual observer.

It is yet another object of the present invention to provide a lightweight protective window which scientifically combines the advantages of different types of transparent protective sheets by layering the protective sheets in a manner which is most efficient in halting high velocity projectiles.

It is yet another object of the present invention to provide the lightweight protective window with the advantages described above which is extremely durable. The window must have a hard glazed outer surface which resists marring. It must also deal with the problem of differential expansion and contraction rates attendant to the use of sheets of material having different such properties. The protective window must further have means of permanently excluding harmful gases, vapors and dust from any spaces which result in the protective window due to meeting the above requirements.

It is yet another object of the present invention to produce lightweight protective windows having the advantages described above, which are both economical to use and capable of being used in many different situations and for many different purposes.

BRIEF DESCRIPTION OF THE PREFERRED EMBODIMENT

Figure 1:
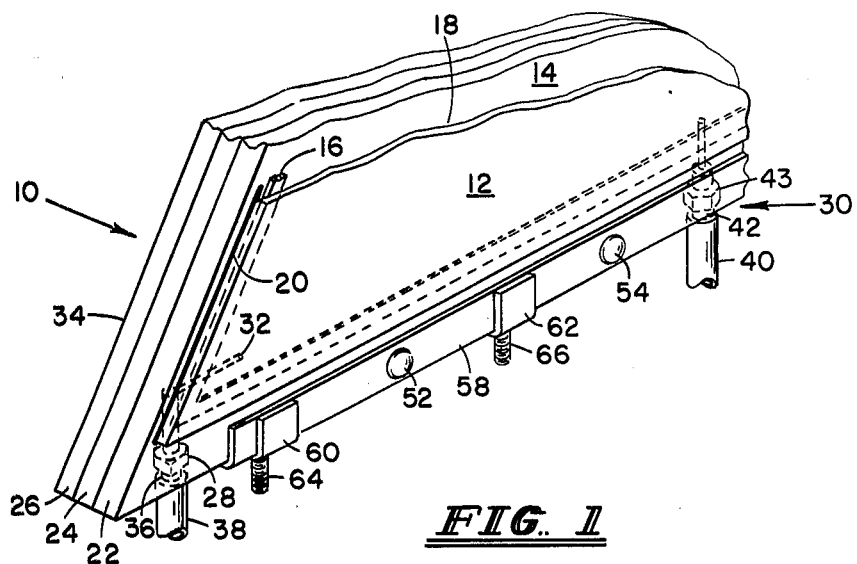
FIG. 1 is a perspective view of a protective window.

Referring to FIG. 1 of the drawings, there is shown a protective window 10. An outer section 12 is composed of a single sheet of safety plate glass. An inner section 14 is composed of layers of polycarbon laminate. A single strip of double sided sealing tape 16 is located within the edges and between the outer section 12 and the inner section 14. Enclosed space 18 is thus formed between outer section 12, inner section 14, and the double sided sealing tape 16. A silicon type sealant 20 is applied at the outer junctions of outer section 12 and inner section 14 such as to further seal the enclosed space 18.

Inner section 14 is further composed of three layers: a first layer 22, a second layer 24, and a third layer 26. The layers are composed of polycarbon laminate materials which are specifically designed to resist spalling. The third layer of the inner section 26 is composed of a polycarbon laminate having a hard surface to resist normal wear and tear due to whatever activities are expected to occur behind said protective window 10. In operation the outer section 12 composed of the safety plate glass initially shatters and/or fragments the incoming projectile, typically a lead bullet. In order to accomplish such a fragmenting of the projectile, the safety plate glass of the outer section is necessarily composed of extremely hard and rigid materials. Due to this composition the outer section may fracture on the impact of such projectile. The inner layers 22, 24, and 26, however, are composed of the softer polycarbon laminate materials. These layers 22, 24, and 26 serve to catch and hold the fragments of the projectile. Because the layers 22, 24, and 26 are composed of the softer, more flexible polycarbon laminate materials, the inner section 14 will not fracture. The innermost layer, the third layer 26, is composed of a polycarbon laminate having a hard surface to resist normal wear and tear due to whatever activities are expected to occur behind said protective window 10. Upon the outer surface of the protective window 10 is located the outer section 12 which is typically composed of safety plate glass. The protective window 10 is thus protected upon all sides by hard wear resistant surfaces.

It is thus seen that the arrangement and composition of materials in the above described protective window 10 is ideally suited to the stopping of high velocity projectiles impacting upon the outer section 12 of the protective window. There are certain problems, however, which must be met in order that such a window may be constructed and used over an extended period of time. A first such problem is that because of the extreme difference in density between the safety plate glass of the outer section 12 and the polycarbon laminate layers 22, 24, and 26 of inner section 14 differential rates of expansion occur as between the outer section 12 and the inner section 14. Because the protective windows 10 are not expected to be exclusively used in temperature controlled areas, it is seen that the outer section 12 cannot be directly attached to the inner section 14. Such a direct attachment would result in severe stress and eventual breakage within the protective window 10. This immediate problem is solved, as shown above, by attaching outer section 12 to inner section 14 by means of doubled sided sealing tape 16 and sealant 20 such that an enclosed space 18 is formed between the outer section 12 and the inner section 14. The double sided sealing tape 16 and the silicon type sealant 20 are each flexible enough to accomodate the movement attendant to the differential rates of expansion of the sections 12 and 14 and the enclosed space 18 separates the sections 12 and 14 from each other at all other points.

Figure 2:
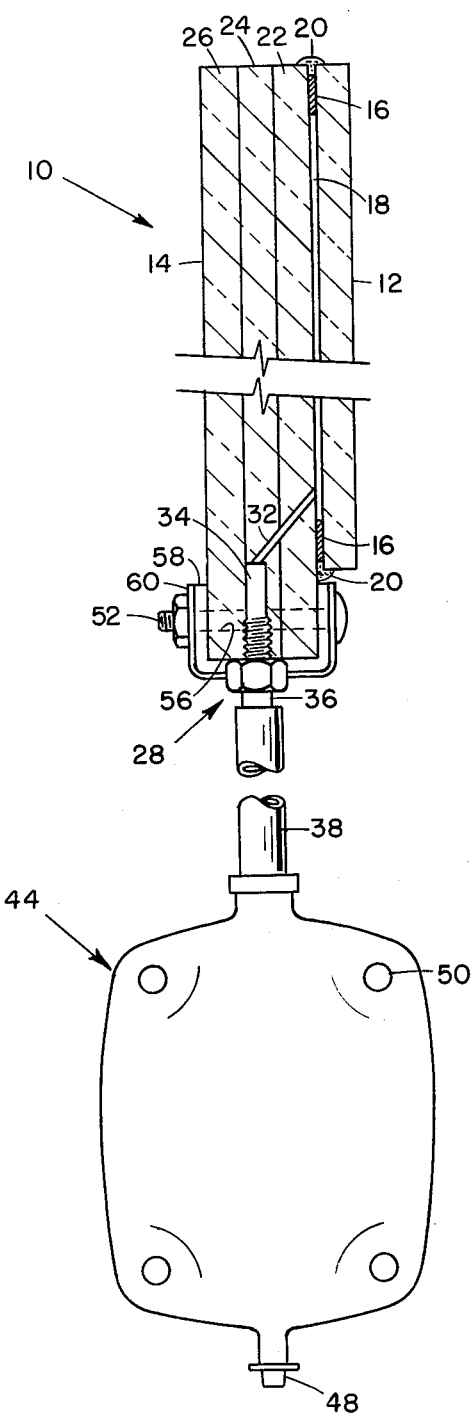
FIG. 2 is a cross-sectional view of the protective window as shown in FIG. 1.

Referring to FIG. 2, it can be seen that the inlet 28 is comprised of a slanting hole 32, bore 34, and outer attachment 36. It is seen that the slanting hole 32 is located primarily within the first layer 22 of the inner section 14. The bore 34 is primarily located within second layer 24 of the inner section, and the outer attachment 36 is threadably attached within thread bore 34. A tube 38 is attached to the outer end of the outer attachment 36.

Referring to FIG. 1, it is seen that the outlet 30 contains identical components as does inlet 28. Second tube 40 is attached upon the outer attachment 42 of the outlet 30. Immediately prior to sealing the inner and outer sections 14 and 12 together as discussed above, nitrogen gas is introduced through the first tube 38 and into the closed space 18. As the pressure of the nitrogen gas increases within the enclosed space 18, the pressurized nitrogen gas escapes through second tube 40 into the general atmosphere. The silicon sealant 20 can now be applied to seal the enclosed space 18. Because the enclosed space 18 is continually being purged by the nitrogen gas, insufficient quantities of the silicon vapors are allowed to accumulate within the enclosed space 18 to mar the inner surfaces of the outer section 12 or the inner section 14. It is usually necessary to allow such purging to continue for approximately twelve hours while the silicon sealant 20 sufficiently cures. After the sealant 20 has cured, the harmful silicon vapors are no longer give off and the necessity of continually purging the enclosed space 18 is eliminated. Nitrogen is selected for the purging process because it is an inert gas which is extremely unlikely to react with the silicon vapors or the polycarbon laminate inner surfaces.

Still another problem inherent in the use of an enclosed space 18 is the accumulation of dust, moisture, and other clouding vapors within the enclosed space over an extended period of time. Traditional methods of keeping such clouding elements from within the enclosed space 18 rely primarily upon extremely tight and impermeable seals between the enclosed space 18 and the outer environment. No seal is eternally impermeable, however, and such dependence solely upon impermeable seals is doomed to failure. During temperature changes which cause expansion of the safety plate glass of the outer section 12 or the polycarbon laminate material of inner section 14, the area occupied by the enclosed space 18 is increased. This causes a lower gas pressure within the enclosed space 18 than existed prior to the temperature caused expansion. This will have the effect of drawing more highly pressurized gases and clouding vapors through the so-called "impermeable" seals and into the enclosed space 18. Further it is seen that merely pressurizing the area within the enclosed space 18 is also a short-term solution because the inherent imperfectness of the seals will allow the inner pressure to be dissipated from within the enclosed space 18 to the atmosphere over an extended period of time.

Referring to FIG. 2, a reservoir sack 44 is shown connected to outer attachment 36 by means of tube 38. The reservoir sack 44 is pre-pressured with approximately two and one-half pounds of dry nitrogen gas. When the enclosed space has been purged with dry nitrogen gas from an inexhaustible reservoir for a sufficient period of time to allow the silicon type sealants 20 to cure, the screw type valve 43 of the outlet 30 is closed simultaneously with removal of the first tube 38 from the inlet 28. The tube 38 is thereupon attached to the outer attachment 36 of the inlet 28 prior to a total loss of positive nitrogen gas pressure within the enclosed space 18.

The reservoir sack 44 protects against the inevitable communication of gases between the enclosed space 18 and the general atmosphere. Because the amount of gases contained within the reservoir sack 44 is large as compared to the amount of gases contained within the enclosed space 18, the method insures that for an extended period of time any gaseous communication will occur from the enclosed space 18 to the general atmosphere rather than vice versa. This prevents vapors and dust from invading the enclosed space 18.

The nitrogen reservoir sack 44 must be composed of an impermeable material which is flexible enough to provide a collapsible reservoir so as to maintain internal pressure for long periods of time. It has been found that sack reinforcements 50 as shown in FIG. 2 are necessary in order to enable the sack 44 to retain relatively high gas pressures without splitting at the corners over an extended period of time. When permanently installed, the pressure within the enclosed space 18 may be checked either by attaching a pressure gauge to reservoir sack valve 48. Great care must be taken in selecting the plastics utilized in reservoir sack 44 and in the design of the reservoir sack 44 to prevent the sack from becoming the weak link in the means for maintaining the nitrogen gas pressure. After much experimentation and many failures in attempting to design reservoir sacks 44, it has been found that the design as shown is satisfactory for these purposes.

To assemble the protective window 10, normally a table having a soft, clean top, such as felt, is used. The inner section 14 is placed flat upon the top of the table with the third layer 26 being adjacent to the felt. A strip of doubled sided sealing tape 16 is placed upon the outer face of the inner section 14 just within the outer edges of inner section 14 and parallel to the edges. The different strips of double sided sealing tape 16 are matched at the corners of the inner section 14 to provide a substantially continuous strip of double sided sealing tape 16. A substantially square shaped protective window 10 would thus utilize four different strips of double sided sealing tape 16, the ends of which strips would all be diagonally cut so as to exactly match the diagonally cut corners of each adjoining strip of double sided sealing tape 16.

The precut outer section 12 is now placed upon the inner section 14 and the double sided sealing tape 16. Pressure is applied downward upon the outer section 12 either by vices, weights, or other means. Once in this position, the outer section 12 is permanently affixed to the inner section 14. The sealant 20 is then applied about the edges of outer section 12 and inner section 14 so as to seal the space between the sections 12 and 14. The sealant used may be a General Electric silicon construction sealant of the 1400 series or a similar type sealant. Because these sealants often give off fumes while they are curing, a well-ventilated work area must be provided. Furthermore, as discussed above, prior to applying the silicon sealants 20, a purging of the enclosed space 18 with a dry nitrogen gas will have been initiated and will be continued until the silicon type sealants 20 have completely cured. Upon completion of the curing process, the reservoir sack 44 is attached and the screw type valve 40 is closed, also as discussed above.

In order to install the protective window 10, certain adjustments on the basic concept must be made. The polycarbon laminate layers 22, 24, and 26 of the inner section comprise a sturdy unit which may be readily used for attachment purposes. In contrast, the safety plate glass of which the outer section 12 is composed is an extremely hard and brittle material which is difficult to work with. Drilling through the outer section or placing the outer section 12 in a vice-like attachment may crack or fracture the outer section 12. A preferred form of construction, therefore, is to utilize an inner section 14 which is both longer and taller than the outer section 12. Construction of the protective window 10 is accomplished in the same fashion with the exception that certain portions of the outer face of the inner window 14 are left uncovered by the outer section 12. This is shown in both FIGS. 1 and 2. Cross bolts 52 and 54 may be inserted through pre-drilled holes in the inner section, such as pre-drilled hole 56. A channel 58 may be securely fastened to inner section 14 by utilizing the cross bolts 52 and 54 in the manner as shown in FIGS. 1 and 2. Further, mounting brackets 60 and 62 each having a mounting bolt 64 and 66 thereon are attached to channel 58 by any suitable means, such as welding. The mounting bolts 64 and 66 extend downwardly from respective mounting brackets 60 and 62. This type of securing means may be used upon any edge of the protective window 10 which must be secured to an outer object.

Figure 3:
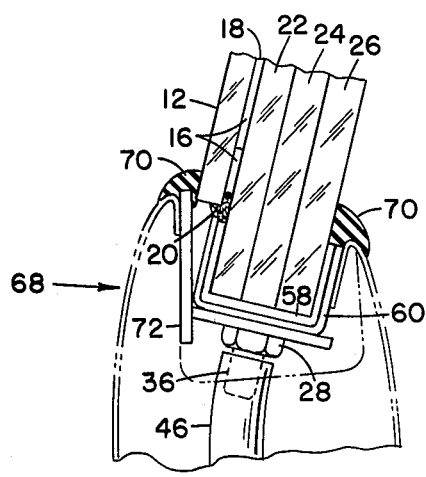
FIG. 3 is an end view of the protective window showing a method of installation within an automobile.

FIG. 3 shows a protective window 10 as it may be mounted to the door of an armored vehicle 68. Note that the tube 38 is attached to inlet 28 to supply pressurized nitrogen gas to within the enclosed space 18. Note further that while rubber window trim 70 is mounted about the protective window 10 to reduce vibration in the protective window and to additionally secure the protective window, that the primary means of supporting the weight of the protective window 10 is by means of the mounting bracket 60 and door attachment 72.

To provide an easy means of visual inspection, a small pressure gauge may be included within the enclosed space 18. Workable pressure gauges which operate upon sample pressures of less than one atmosphere and workable pressure gauges which operate upon sample pressures of more than one atmosphere are either available or may be constructed using known methods. Additionally, outlets and valves may be located upon the window 10 or reservoir 44 as may be convenient for periodic checking of pressure within the enclosed space 18 and reservoir 44.

Figure 4:
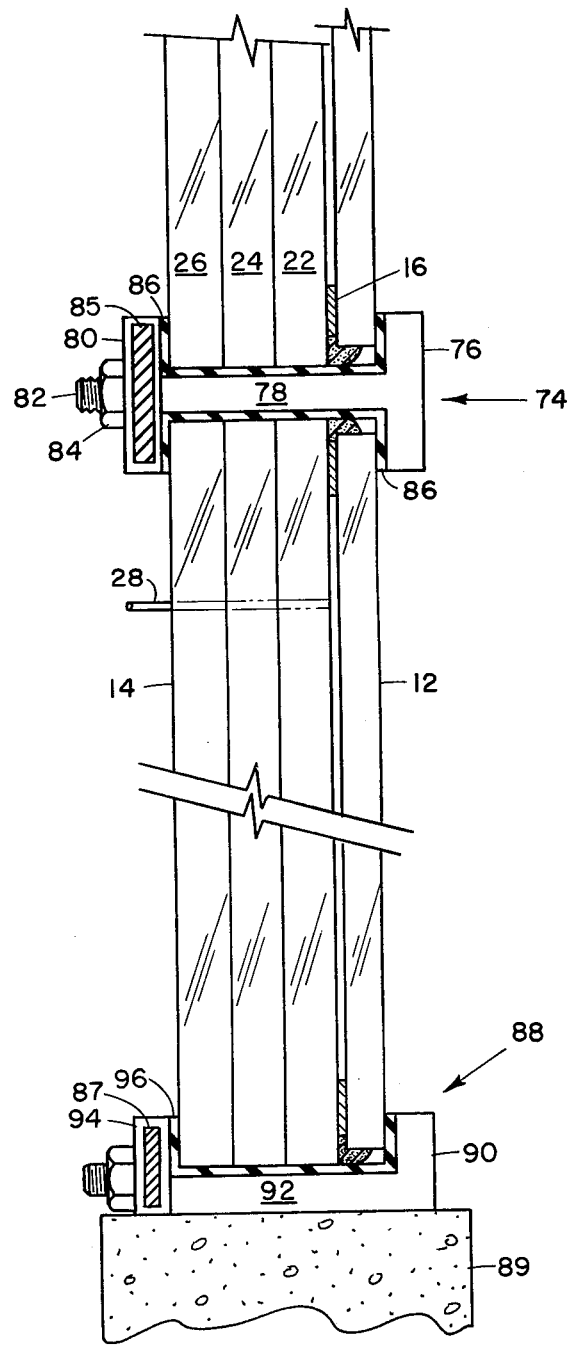
FIG. 4 shows the protective window installed in a permanent location.

FIG. 4 shows protective window 10 with a protective connecting piece 74 connecting protective window 10 with an identical protective window 10. The protective connecting piece 74 contains a front plate 76, joining member 78, and a rear plate 80. These three elements of the protective connecting piece 74 may be attached in any convenient fashion. In this particular embodiment, joining member 78 is welded to front plate 76. Rear plate 80 is bolted by means of bolt 82 and nut 84 to joining member 78. By use of a connecting means similar to the connecting piece 74 shown, many different types of protective windows may be joined together to form a continuous bulletproof barrier. In the embodiment shown in FIG. 4, the rear plate 80 is filled with a bullet resistant material 85 and front plate 76 is merely used to provide a structural support. Alternative embodiments allow front plate 76 to contain the bullet resistant materials. An expansion cushion 86 is located upon both sides of the joining member 78 and upon the other side of either a front plate 76 or the rear plate 80.

The expansion cushion 86 is a flexible material which can accomodate the various expansions and contractions of the different layers of the protective window 10 which result due to changing temperatures.

Referring again to FIG. 4, it is seen that protective window 10 is resting upon a holder 88. Holder 88 rests upon a wall 89 which is not penetrable by bullets. A typical wall would be composed of steel and concrete. Holder 88, like protective connecting piece 74, has a forward plate 90, a joining member 92, and a rear plate 94. Either the forward plate 90 or the rear plate 94 may be armored. Because both the wall 89 and the protective window 10 will expand and contract upon temperature changes, an expansion cushion 96 is located between forward plate 90 and rear plate 94.

Note that in FIG. 4 inlet 28 is shown as extending perpendicularly out of inner section 14. This is an alternative embodiment of the protective window 10 which allows use of the type protective connecting piece 74 described.

A novel protective window has thus been shown together with novel ancillary devices necessary to make the protective window commercially feasible in the marketplace. The novel means of layering the different protective sheets, of providing various enclosed spaces, means of purging those spaces, means of maintaining a positive pressure through the use of reservoirs, and means of installing the protective windows are all new and novel to the protective window art. The marketplace has recognized the novelty and usefulness of these inventions and the above described products are being utilized to perform functions which conventional protective windows are not able to fulfill.

I claim:
1. A protective window comprising:
 a first section of translucent material and a second section of translucent material, and first section and said second section being separated by a space, and said first section and said second section being composed and constructed to resist penetration by high velocity projectiles;
 a coupling located between said first section and said second section, the combination of said coupling, said first section, and said second section enclosing said space and preventing substantial gaseous communication between said enclosed space and atmosphere;
 a low pressure gaseous drying agent within said enclosed space, said gaseous drying agent being pressurized more than one atmosphere;
 means for maintaining pressure of said gaseous drying agent at more than one atmosphere, said gas maintaining means operating by supplying additional gaseous drying agent via passage means to within said enclosed space as may be necessary to maintain pressure of said gaseous drying agent at more than one atmosphere, said means for maintaining including;
   at least one window aperture, said window aperture being a means of gaseous communication between said enclosed space and a gaseous drying agent reservoir; and
   a combination comprising said enclosed space, said window aperture, said passage means, and said gaseous drying agent reservoir, said combination being constructed and designed so that upon loss of said gaseous drying agent from within said enclosed space, additional quantities of said gaseous drying agent are communicated from said gaseous drying agent reservoir to within said enclosed space as to at least partially offset said loss of said gaseous drying agent from within said enclosed space and thereby maintain a gas pressure of more than one atmosphere within said enclosed space;
 said gaseous drying agent reservoir being substantially impermeable to gaseous diffusion and capable of containing said gaseous drying agent at more than one atmosphere for extended periods of time without undue leakage, said gaseous drying agent reservoir being designed and constructed to exert a continuous positive pressure upon said gaseous drying agent such that some of said gaseous drying agent is communicated from said gaseous drying agent reservoir to said enclosed space, said gaseous drying agent reservoir continuing to exert positive pressure upon said gaseous drying agent remaining within said gaseous drying agent reservoir; and
 said gaseous drying agent reservoir including an elastic collapsible bag.

2. The protective window of claim 1 wherein said gas reservoir further comprises a gas transfer valve for repressurizing said container with said gas.

3. The protective window of claim 1 further comprising a means of checking said gas pressure, said checking means comprising a pressure gauge located within said enclosed space, said gauge being located and positioned to allow said gauge to be visually checked from at least one side of said protective window.

4. The protective window of claim 1 further comprising means of checking said gas pressure, said checking means comprising a valve located upon said container such that said gas pressure within said enclosed space may be read upon attaching gas pressure gauge to said valve.

5. The protective window of claim 1 wherein said gaseous drying agent is dry nitrogen and said protective window and said gaseous drying agent reservoir are designed and constructed to maintain said dry nitrogen gas at approximately two and one-half pounds per square inch of pressure.

6. The protective window of claim 1 wherein at least two bores are located within said protective window, said bores being usable to purge said enclosed space of prior gases by utilizing at least one said bore as an inlet bore for accepting purging gas to within said enclosed space and at least one other said bore as an outlet bore for expelling said prior gases and said purging gas.

7. The protective window of claim 1 wherein said first section comprises at least two layers, an outer layer composed of a hard glazed material which provides a smooth outer surface and an inner layer composed of bullet-resistant materials which resist spalling and said second section comprising at least one layer of protective material, said layer being composed of bullet-resistant materials which resist spalling.

8. The protective window of claim 1 further comprising:
a protective connecting piece located about the edges of said first section and the edges of said second section, said protective connecting piece being composed of three parts, a first guard plate located adjacent to and parallel to the outer surface of a said section, a second guard plate located adjacent to and parallel to the outer surface of the other said section, and a joining member, a first end of said joining member being attached to said first guard plate and a second end of said joining member being attached to said second guard plate;
one of said guard plates being composed and designed to be bullet-resistant and extending beyond the edges of said sections such that said protective connecting piece prevents bullets from bypassing said protective window when said protective window is positioned within a properly sized cavity and an expansion cushion located upon adjacent to said joining member and one of said guard plates, said expansion member being composed of a flexible material capable of accommodating temperature caused expansion and contraction of said layers of said protective window.

* * * * *